US007815039B2

(12) United States Patent
Enomoto

(10) Patent No.: US 7,815,039 B2
(45) Date of Patent: Oct. 19, 2010

(54) BELT SKEW CORRECTION DEVICE, BELT TRANSPORTATION DEVICE, AND RECORDING DEVICE

(75) Inventor: Katsumi Enomoto, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 12/328,067

(22) Filed: Dec. 4, 2008

(65) Prior Publication Data

US 2009/0145729 A1 Jun. 11, 2009

(30) Foreign Application Priority Data

Dec. 5, 2007 (JP) ............................. 2007-314713
Nov. 26, 2008 (JP) ............................. 2008-301109

(51) Int. Cl.
*B65G 39/16* (2006.01)

(52) U.S. Cl. ................................. 198/806; 198/810.03

(58) Field of Classification Search ................. 198/860, 198/807, 810.03
See application file for complete search history.

(56) References Cited

U.S. PATENT DOCUMENTS 4,959,040 A * 9/1990 Gardner et al. .............. 198/807
5,471,289 A * 11/1995 Satoh et al. ................. 198/806
5,717,984 A * 2/1998 Wong ......................... 198/806
5,911,304 A * 6/1999 Cumberlege ................ 198/806
5,934,449 A * 8/1999 Dolan ........................ 198/806
5,964,339 A * 10/1999 Matsuura et al. ....... 198/810.03

FOREIGN PATENT DOCUMENTS

JP 06-009096 1/1994
JP 06-056294 3/1994
JP 11-344906 12/1999
JP 11334925 12/1999
JP 2002-251080 9/2002

* cited by examiner

*Primary Examiner*—James R Bidwell
(74) *Attorney, Agent, or Firm*—Workman Nydegger

(57) ABSTRACT

To provide a belt skew correction device capable of performing appropriate skew correction that is appropriate for each state at a time when the belt is in a state of a high skew speed or in a state of a low skew speed.

10 Claims, 12 Drawing Sheets

FIG. 10

| ROTATION ANGLE OF CAM (°) (AMOUNT OF ROTATION DRIVING OF ROTARY DRIVER) | WAITING TIME Y (SECONDS) | |
|---|---|---|
| 0 | 8.5 | IF NOT RETURNED AFTER ELAPSE OF WAITING TIME, ERROR IS DETERMINED, AND STOP CAM OPERATING MOTOR |
| 5 | 8 | |
| 10 | 7.5 | |
| 15 | 7 | |
| 20 | 6.5 | |
| 25 | 6 | |
| 30 | 5.5 | |
| 35 | 5 | |
| 40 | 4.5 | |
| 45 | 4 | |
| 50 | 3.5 | |
| 55 | 3 | |
| 60 | 2.5 | |
| 65 | 2 | |
| 70 | 1.5 | |
| 75 | 1 | STABLE POSITION |
| 80 | 1.5 | IF NOT RETURNED AFTER ELAPSE OF WAITING TIME, ERROR IS DETERMINED, AND STOP CAM OPERATING MOTOR |
| 85 | 2 | |
| 90 | 2.5 | |
| 95 | 3 | |
| 100 | 3.5 | |
| 105 | 4 | |
| 110 | 4.5 | |
| 115 | 5 | |
| 120 | 5.5 | |
| 125 | 6 | |
| 130 | 6.5 | |
| 135 | 7 | |
| 140 | 7.5 | |
| 145 | 8 | |
| 150 | 8.5 | |

CORRESPONDENCE TABLE BETWEEN ROTATION ANGLE OF CAM (AMOUNT OF ROTATION DRIVING OF ROTARY DRIVER) AND WAITING TIME

BELT SKEW CORRECTION DEVICE, BELT TRANSPORTATION DEVICE, AND RECORDING DEVICE

TECHNICAL FIELD

The present invention relates to a belt skew correction device including a belt skew correcting roller that corrects skew of an endless belt by being brought into contact with a surface of the endless belt that is wound between a driving roller and a driven roller and an inclination mechanism that inclines the belt skew correcting roller in a direction for correcting the skew of the endless belt, a belt transportation device including the belt skew correction device, and a recording device including the belt transportation device.

Here, "a recording device" includes a printer (a line printer, a serial printer, or the like), a facsimile machine, a copier, and the like.

BACKGROUND ART

Hereinafter, a copier as an example of a recording device will be described as an example. As represented by Patent Document 1 or 2 described below, in the copiers, as a transport unit for a recording material, a belt transportation device is frequently used. In the belt transportation device, there is a problem of skew of an endless belt that is wound between a driving roller and a driven roller. When the skew of the endless belt occurs, the recording material in the middle of a transport process has a slope, and accordingly, disturbance or slope occurs in an image acquired from performing recording for the recording material. In addition, when the skew of the endless belt is neglected, the edge of the endless belt is damaged, and thereby a decrease in the transport force, disturbance of transport, or stop of transport occurs.

Accordingly, as shown in Patent Document 1 or 2, generally, a belt skew correction device is built in the belt transportation device, and whereby the occurrence of the above-described inconvenience due to skew of the endless belt is reduced.

[Patent Document 1] U.S. Pat. No. 3,082,452

[Patent Document 2] Japanese Unexamined Patent Application Publication No. 2002-251080

DISCLOSURE OF INVENTION

Problem that the Invention is to Solve

In conventional belt skew correction devices, as an inclination mechanism for inclining a belt skew correcting roller, a cam mechanism is used. A cam configuring the cam mechanism rotates integrally with a rotation driving body that uses a motor or the like as a driving source. The inclination amount of the belt skew correcting roller is configured to have a predetermined proportional relationship (linear relationship) for the amount of rotation driving of the cam.

However, the amount of rotation driving of the cam and the inclination amount of the belt skew correcting roller, as described above, are configured to have a predetermined proportional relation. Accordingly, there is a problem that speedy skew correction cannot be performed at a time when the belt is in a state (hereinafter, also referred to as a "highly unstable state") of a high skew speed and delicate skew correction cannot be performed at a time when the belt is in a state (hereinafter, also referred to as a "slightly unstable state") of a low skew speed that is slightly deviated from a stable state. When the gradient of the proportional relation is set to be large, speedy skew correction can be performed for the highly unstable state. However, in such a case, delicate skew correcting cannot be performed for the slightly unstable state. Accordingly, appropriate skew correction cannot be performed for each state. On the other hand, when the gradient is set to be small, delicate skew correction can be performed for the slightly unstable state. However, in such a case, speedy skew correction cannot be performed for the highly unstable state.

This problem becomes remarkable for a case where a driving body that is used for driving rotation of a cam is configured to perform a driving operation intermittently for each unit amount of driving for simplifying the rotation driving control of the cam.

The object of the present invention is to provide a belt skew correction device capable of performing both a delicate control process and a speedy control process for belt skew correction in a series of skew correcting processes and performing a skew correcting process that is appropriate to each state for a case where the belt is in a state (the highly unstable state) of a speedy skew speed and for a case where the belt is in a state (the slightly unstable state) of a slow skew speed, a belt transportation device including the belt skew correction device, and a recording device including the belt transportation device.

BRIEF DESCRIPTION OF DRAWINGS

FIG. 10 is an example of a table that relates the rotation angle (the amount of driving rotation of a rotation driving body) of an inclination cam with a set waiting time.

MEANS FOR SOLVING THE PROBLEM

Figure 1:
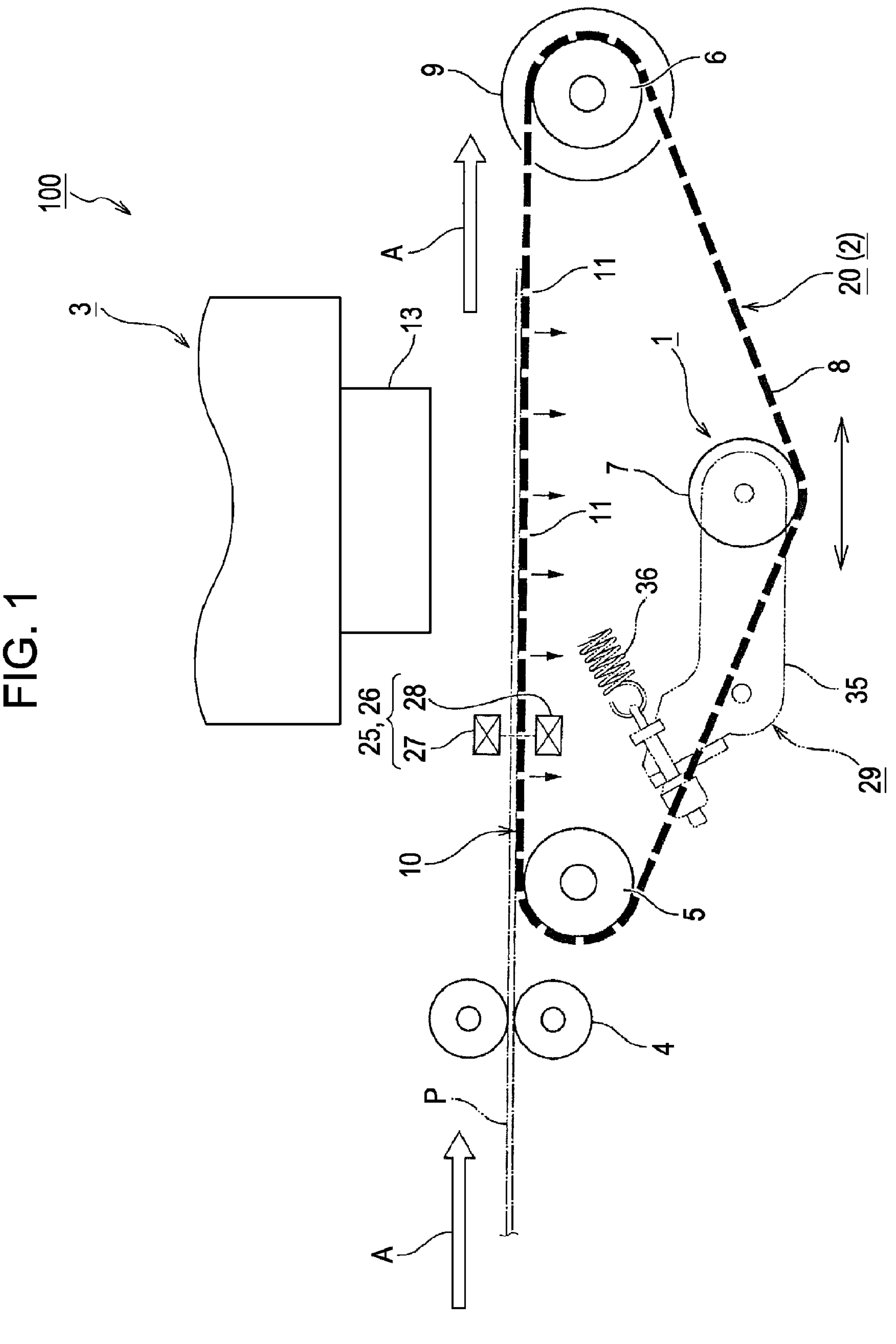
FIG. 1 is a side cross-sectional view schematically showing an outline of the internal structure of an ink jet printer including a belt transportation device according to the present.

In order to solve the above-described problem, according to a first aspect of the present invention, there is provided a belt skew correction device including: a belt skew correcting roller that corrects skew of an endless belt by being brought into contact with a surface of the endless belt that is wound between a driving roller and a driven roller; and an inclination mechanism that inclines the belt skew correcting roller in a direction for correcting the skew of the endless belt. The inclination mechanism includes a driving body that performs a driving operation intermittently by a unit amount of driving and a conversion mechanism that has relationship corresponding to the driving amount of the driving body and converts driving of the driving body into inclination of the belt skew correcting roller, and in a case where the driving body intermittently proceeds with a driving operation by the unit amount of driving, the conversion mechanism is configured such that relationship between a driving amount and an inclination amount has correlation having an area in which the degree of corresponding change in the inclination amount is low and an area in which the degree of corresponding change in the inclination amount is high. Accordingly, by only driving the driving body intermittently, both speedy control and delicate control for belt skew correction can be performed during a series of skew correction operations. Therefore, when the belt is in a state (highly unstable state) of high skew speed or in a state (slightly unstable state) of a low skew speed which is slightly deviated from a stable state, skew correction that is appropriate to each state of the belt can be performed appropriately.

In addition, according to a second aspect of the present invention, in the belt skew correcting device of the first aspect, the correlation is configured such that an area near the center of a driving range of the driving body becomes the area in which the degree of the change in the inclination amount is low, an area near both ends of the driving range becomes the area in which the degree of the change in the inclination amount is high, and both the areas are continuously connected to each other.

Moreover, according to this embodiment, when the belt returns from the highly unstable state to the stable state, first, speedy skew correction is performed, and as the skew speed decreases, the correction is gradually changed to slow skew correction. Then, finally, the most delicate skew correction is performed. Accordingly, the belt can be returned to the position of the stable state in an easy manner.

In addition, when the belt is in the slightly unstable state from the stable state for any reason, the driving body performs a driving operation intermittently by a unit amount of driving (normally one unit to three units). At this moment, the skew correcting roller changes its slope delicately from the initial position. Accordingly, the skew correcting roller can take a state of a slope (small slope) that is appropriate to skew correction for the slightly unstable state. In other words, an appropriate slope that is not excessive can be set for performing skew correction. Accordingly, the belt can be returned from the slightly unstable state to the stable state in a smooth manner.

On the other hand, when the belt becomes the highly unstable state abruptly from the stable state for any reason, the driving body proceeds with intermittent driving by a unit amount of driving, and thereby the slope of the skew correcting roller is increased gradually. At that moment, first, the change of the slope of the skew correction roller is delicate. However, when the region is passed though, the change of the slope for each unit amount of driving increases. Accordingly, in order to perform skew correction for the slightly unstable state appropriately, an area in which the slope of the skew correcting roller is changed delicately is included, and an area in which the change of the slope of the skew correcting roller for each unit amount of driving of driving body is large is included. Accordingly, a total transition time needed for the skew correcting roller to take the large slope state that is appropriate for the highly unstable state can be shortened.

In addition, according to a third aspect of the invention, in the belt skew correction device of the second aspect, the driving body is a rotation driving body, the conversion mechanism includes a cam mechanism, a cam configuring the cam mechanism rotates integrally with the rotation driving body, and a cam follower is disposed on the belt skew correcting roller side, and the correlation is configured by a relative shape between the cam and the cam follower.

According to this aspect, the correlation between the driving amount of the driving body and the inclination amount of the skew correcting roller is defined by the relative shape of the cam and the cam follower, and therefore the advantages of the second aspect can be acquired under a simple structure.

In addition, according to a fourth aspect of the invention, in the belt skew correction device of any one of the first to third aspects, the belt skew correcting roller is a variable-diameter roller of which roller diameter in the center portion is larger than that in both the end portions.

According to this aspect, in addition to the advantages of any one of the first to third aspects, the following advantages can be acquired. In other words, by using a variable diameter roller as the belt skew correcting roller, the endless belt does not slip easily over the belt skew correcting roller, and accordingly, a force of the belt skew correcting roller for correcting the skew of the endless belt is transferred to the endless belt at high efficiency. In addition, a force for stopping by the center is generated in the endless belt, and accordingly, occurrence of skew of the endless belt is suppressed, and generation of wrinkles in the endless belt is prevented.

In addition, according to a fifth aspect of the present invention, the belt skew correcting device of any one of the first to fourth aspects includes: edge sensors of an ON-OFF switch type that detect each edge position in the belt width direction of the endless belt; and a control device that performs skew correction control for the endless belt by driving the driving body by a unit amount of driving at a time when one of the edge sensors detects the ON state. The control device, when a predetermined waiting time elapses after driving the driving body by the unit amount of driving, determines whether the ON state of the edge sensor is released, further drives the driving body by the unit amount of driving for a case where the ON state is not released, determines again whether the ON state of the edge sensor is released when the waiting time elapses thereafter, and repeats a same operation within limit set in advance for every waiting time.

According to this aspect, the skew correction control is performed for the endless belt by driving the driving body by a unit amount of driving at a time when the ON state is detected by the edge sensor on one side. Thereafter, when a predetermined waiting time elapses, it is determined whether the ON state of the edge sensor is released. For a case where the ON state is not released, the driving body is driven further by the unit amount of driving. Thereafter, when the waiting time elapses, it is determined again whether the ON state of the edge sensor is released, and repeats the same operation within limit set in advance for every waiting time.

Accordingly, skew correction of the belt is automatically performed under a simple structure. Furthermore, as the edge sensor, an inexpensive ON-OFF switch-type edge switch having a relatively simple structure is used. Accordingly, the number of component and component costs can be reduced.

According to a sixth aspect of the present invention, the waiting time is set in correspondence with the value of unit amount of driving at a time when the driving body is driven by a unit amount of driving.

According to this aspect, the waiting time is set (the set waiting time) in correspondence with the value of the driving amount at a time when the driving body is driven by the unit amount of driving, and whereby the skew of the belt is prevented. Therefore, excessive control for preventing skew of the belt can be suppressed.

For example, by setting the waiting time to be shortened for a case where the state of the belt is in the slightly unstable state, the state of the belt can be checked delicately, and thereby skew of the belt can be prevented.

On the other hand, by setting the waiting time to be lengthened for a case where the state of the belt is in the highly unstable state, excessive control for preventing the skew of the belt can be suppressed.

A belt transportation device according to a seventh aspect of the present invention includes: a driving roller that applies a transport force to an endless belt; a driven roller that is disposed to face the driving roller and maintains the endless belt in a strained state together with the driving roller; the endless belt that is wound between the driving roller and the driven roller; and a belt skew correcting roller that corrects skew of the endless belt by being brought into contact with a surface of the endless belt. The belt skew correction device is the belt skew correction device according to any one of the first to sixth aspects.

According to this aspect, in various belt transportation devices having an endless belt, advantages of the belt skewing correction device according to any one of the first to sixth aspects can be acquired. In addition, transport of the transport material is performed smoothly, and the belt transportation device can be operated to be stabilized for a long time.

According to an eight aspect of the invention, there is provided a recording device including: a belt transport device that holds and transports a recording material; and a recording unit that performs recording for the recording material that is held and transported by the belt transportation device. The belt transport device is the belt transport device according to the seventh aspect.

According to this aspect, in a recording device such as an ink jet printer to which the belt transportation device is used as a transport unit of the recording material, the same advantages as those of the seventh aspect can be acquired. In addition, transport of the recording material is performed smoothly, and thereby the recording quality is improved.

BEST MODES FOR CARRYING OUT THE INVENTION

Hereinafter, a belt skew correction device, a belt transportation device having the belt skew correction device, and a recording device having the belt transportation device according to the present invention will be described. First, as a preferred embodiment for implementing the recording device according to the present invention, an ink jet printer 100 in which a belt transportation device as a transport unit for a recording material (hereinafter, also referred to as a paper sheet) P is mounted will be used, and an outline of the entire configuration thereof will be described with reference to the accompanying drawings.

Figure 2:
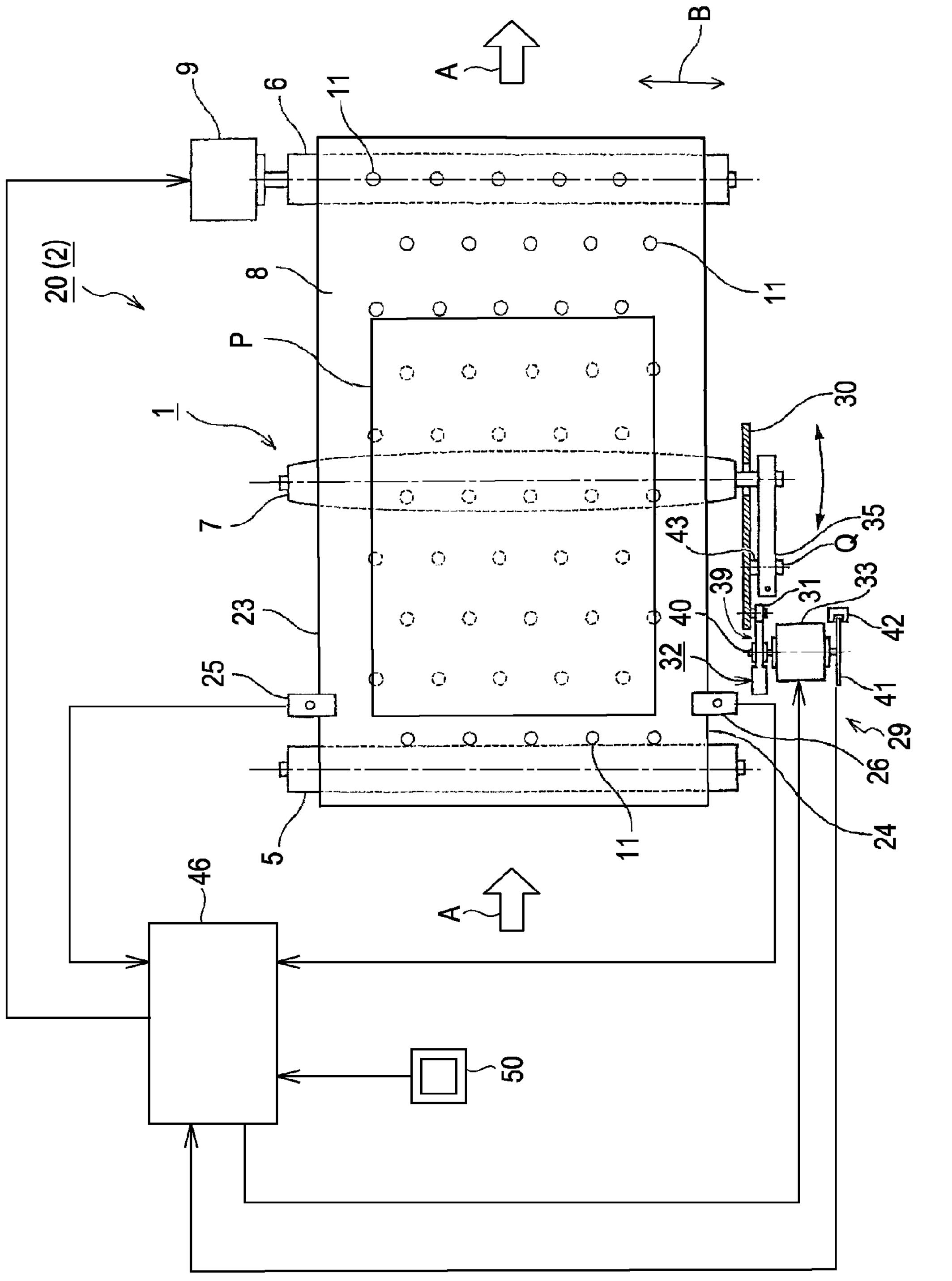
FIG. 2 is a plan view showing a belt transportation device to which a belt skew correction device according to the present invention is applied.
Figure 3:
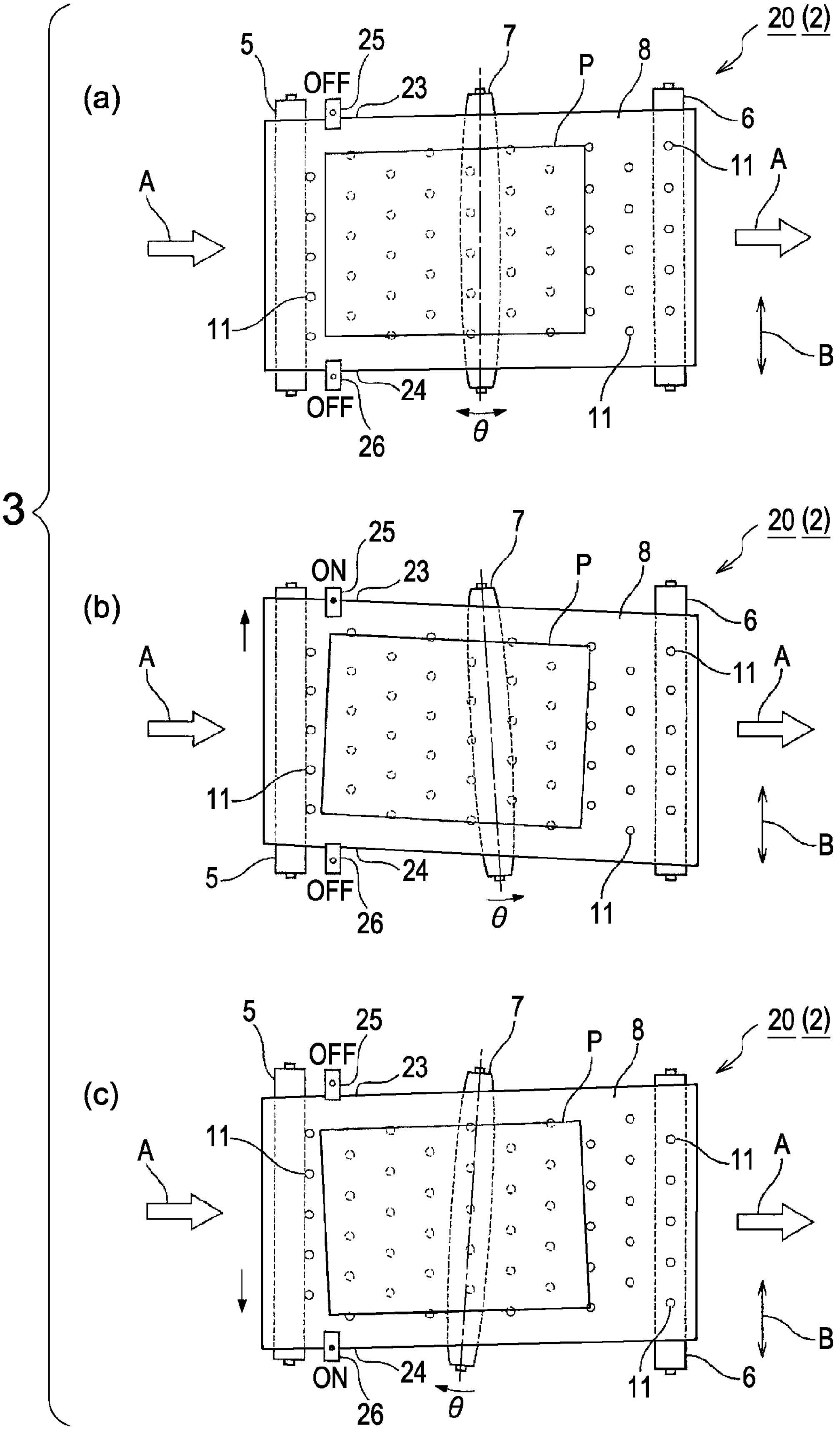
FIG. 3 is a plan view showing the states of an endless belt in a normal case (a), a left-side skewed case (b), and a right-side skewed case (c).

FIG. 1 is a side cross-sectional view schematically showing an outline of the internal structure of an ink jet printer including a belt transportation device to which a belt skew correction device according to the present the invention is applied. FIG. 2 is a plan view showing an outline of the belt transportation device to which the belt skew correction device according to the present invention is applied. In addition, FIG. 3 is a plan view schematically showing the states of an endless belt in a normal case (a) a left-side skewed case (b), and a right-side skewed case (c).

The ink jet printer 100 includes a printer main body, which is not shown in the figure, as an example of a recording device main body. Inside the printer main body, a transport unit 2 that holds and transports a paper sheet P and a recording unit 3 that performs recording for a recording sheet P that is held and transported by the transport unit 2 are disposed. The transport unit 2 is applied as the belt transportation device 20 in the ink jet printer 100, and a paper sheet P fed by a feed unit not shown in the figure is supplied to the belt transportation device 20 through a gate roller 4 that is configured by one pair of nip rollers.

In the belt transportation device 20, a driven roller 5 is disposed on the upstream side in the transport direction A, a driving roller 6 is disposed on the downstream side in the transport direction A, and a belt skew correcting roller 7 that is a constituent member of the belt skew correction device 1 according to the present invention, to be described later, is disposed below a position located between the driven roller 5 and the driving roller 6. The belt transportation device 20 is basically configured by winding an endless belt 8 around three rollers 5, 6, and 7 in the shape of a loop.

The driven roller 5 and the driving roller 6 are members having a straight pipe shape or a round bar shape and have a constant-diameter and a same shape in the axis direction B. Between these, the driving roller 6 is a roller that applies a transport force to the endless belt 8 in the transport direction A. To one end of the driving roller 6, for example, a transport driving motor 9 that transfers power to the driving roller 6, for example, is directly connected. On the other hand, the driven roller 5 is a roller that is disposed at a same height as that of the driving roller 6 and is disposed to be faced with the driving roller 6 with a predetermined distance apart and to be parallel to the driving roller 6. Between the driving roller 6 and the driven roller 5, a transport face 10 of a paper sheet P that is formed by tightly extending the endless belt 8 horizontally is formed.

The endless belt 8 is a member formed of a material such as synthetic rubber that has elasticity and having an endless band shape. In the endless belt 8, a plurality of holes 11, 11, . . . as shown in the figure is formed. Through the holes 11, an operation for adsorbing and holding a paper sheet P is performed by an adsorption device not shown in the figure, and whereby the paper sheet P is adsorbed and held on the transport face 10 of the endless belt 8. As an adsorption method of the adsorption device, for example, a suction method by using negative pressure or an electrostatic adsorption method may be employed. In addition, the recording unit 3 has a record head 13 that performs a recording operation by injecting ink of colors on the upper face of the paper sheet P as a major constituent member.

EMBODIMENT 1

Next, the belt skew correction device 1 according to the present invention that is used in the belt transportation device 20 built in the ink jet printer 100 configured as described above will be described in detail with reference to the accompanying drawings.

Figure 4:
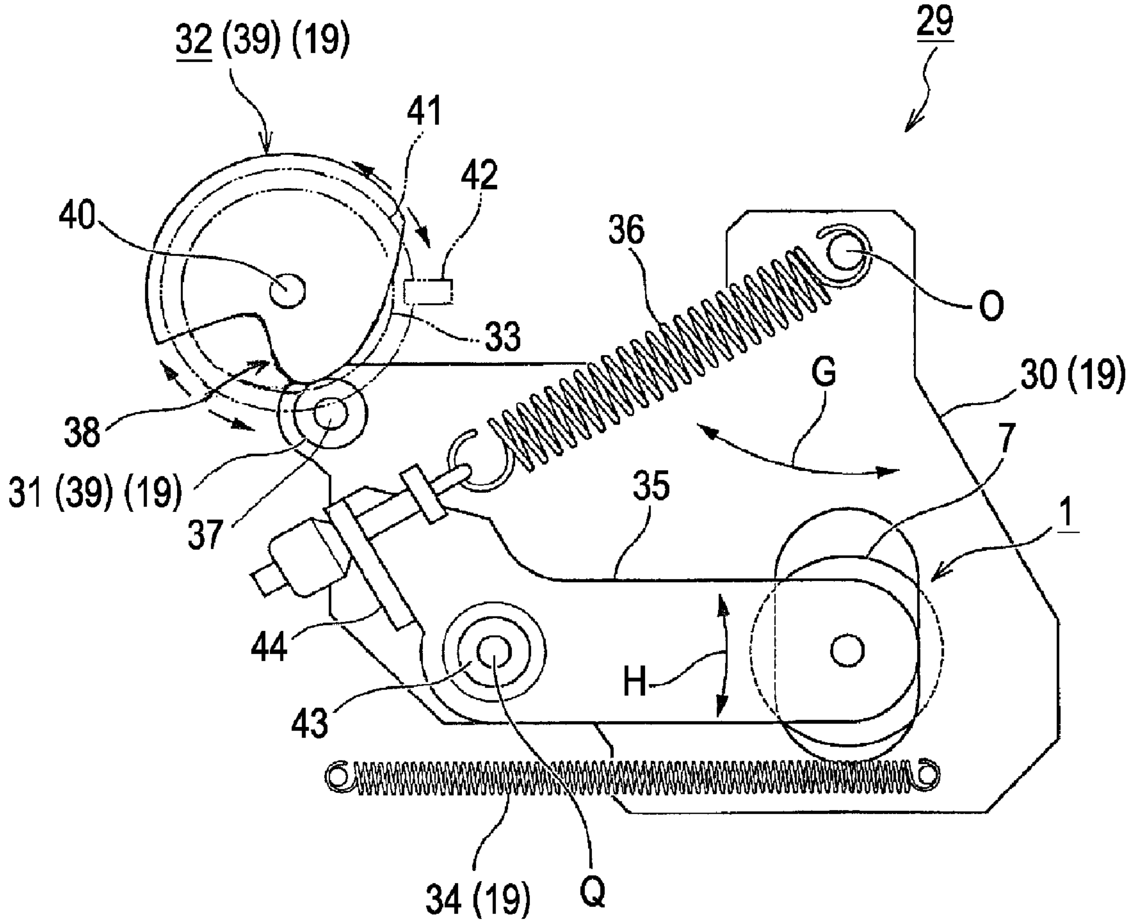
FIG. 4 is a side cross-sectional view showing an inclination mechanism.
Figure 5:
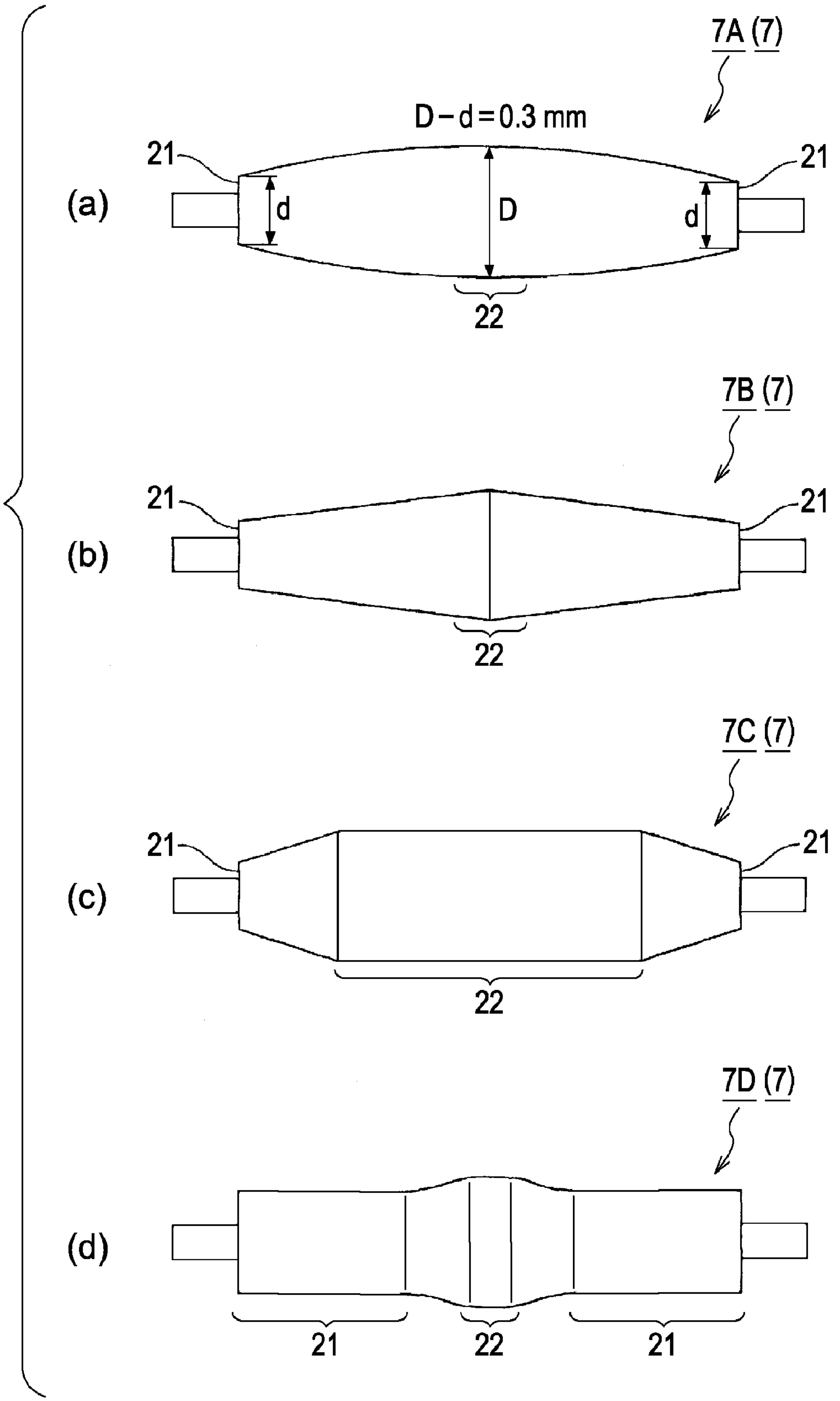
FIG. 5 is a front view showing various shapes of belt skew correcting rollers.
Figure 6:
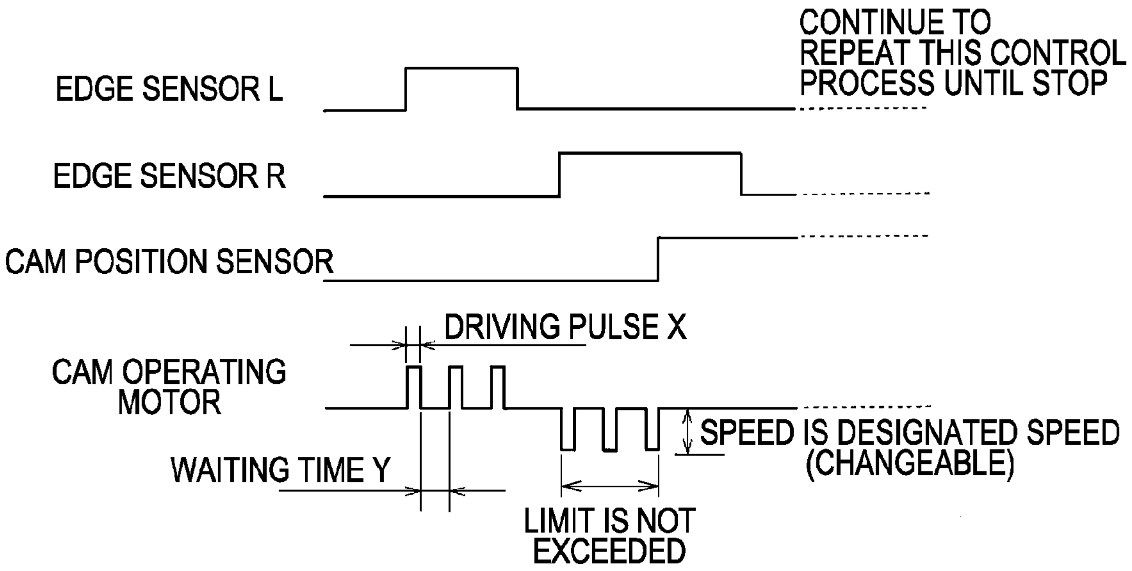
FIG. 6 is a timing chart of skew correction control elements of an endless belt.
Figure 7:
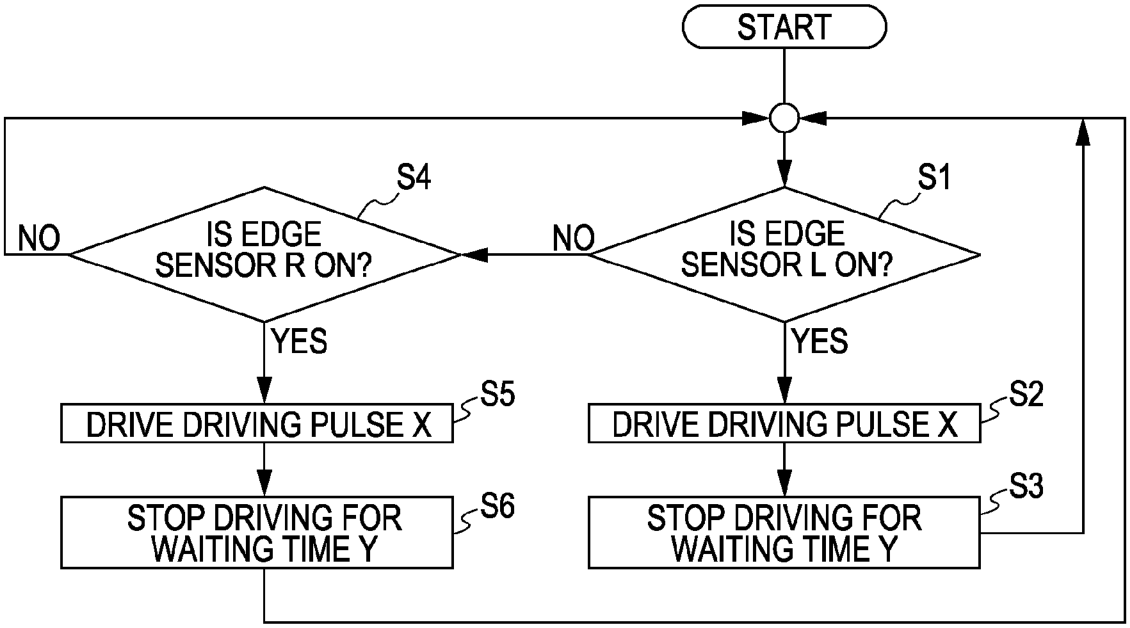
FIG. 7 is a flowchart showing an example of skew correcting control for the endless belt.
Figure 8:
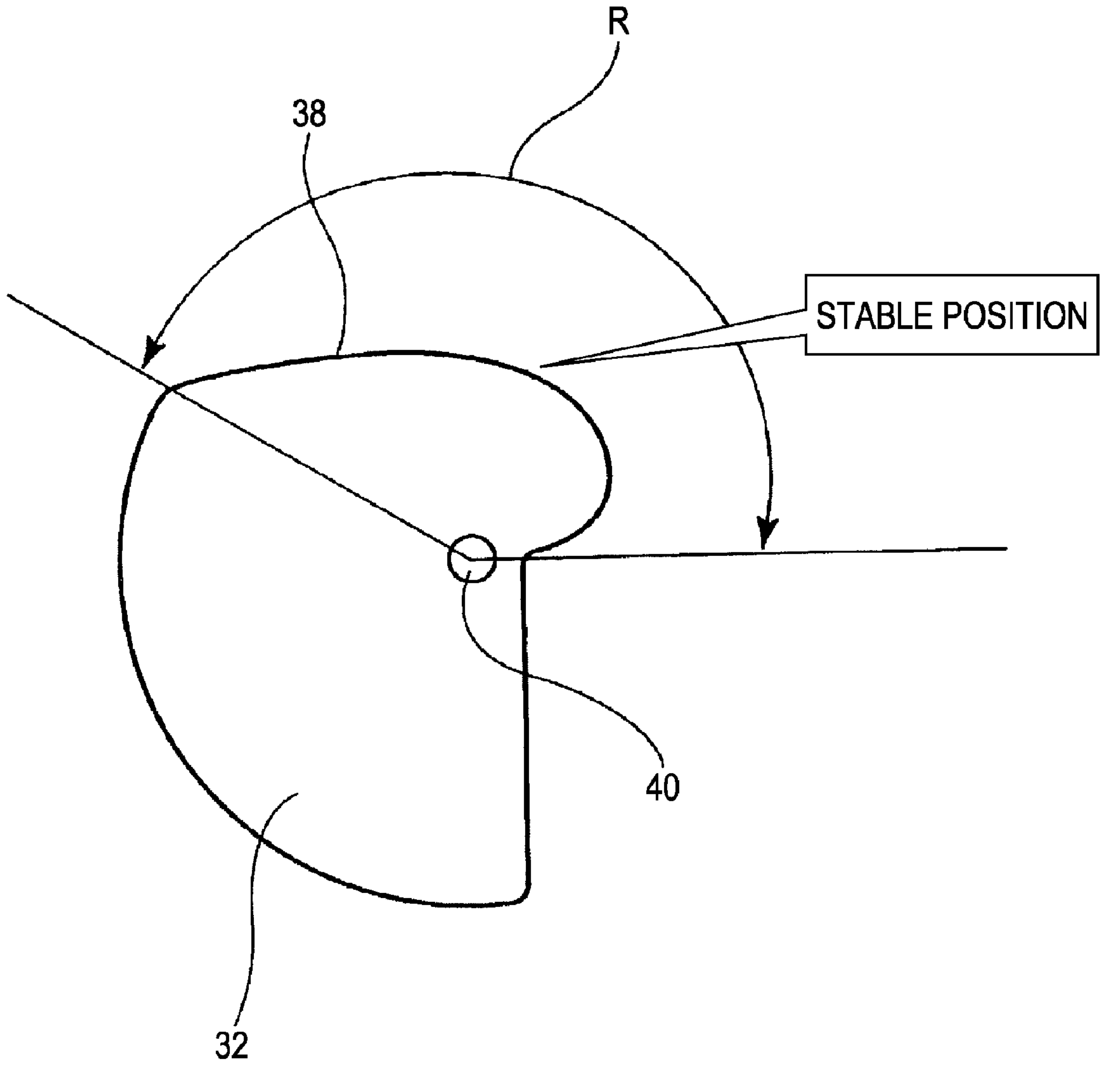
FIG. 8 is a front view of a cam configuring a cam mechanism according to the present invention.
Figure 9:
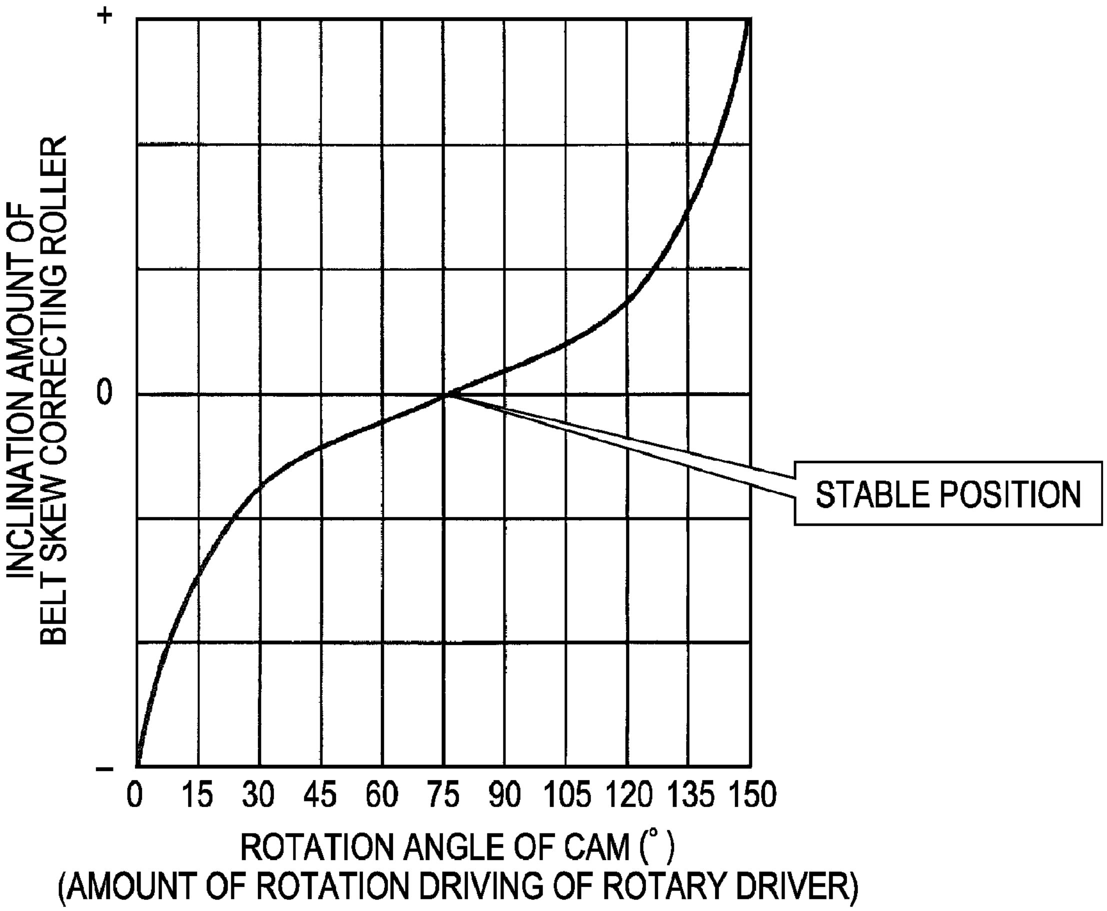
FIG. 9 is a diagram showing relationship between a rotation angle (rotation angle of a rotation driving body) of an inclination cam and the inclination amount of a belt skew correcting roller.

FIG. 4 is a side cross-sectional view showing an inclination mechanism of the belt skew correction device according to the present invention. FIG. 5 is a front view showing various shapes (a) to (d) of belt skew correcting rollers of the belt skew correction device according to the present invention. In addition, FIG. 6 is a timing chart of skew correction control elements of an endless belt, and FIG. 7 is a flowchart showing an example of a skew correcting control process for the endless belt. FIG. 8 is a front view of a cam configuring a cam mechanism according to the present invention, and FIG. 9 is a diagram showing relationship between a rotation angle (rotation angle of a rotation driving body) of the cam and the inclination amount of the belt skew correcting roller.

The belt skew correction device 1 according to this embodiment includes a skew correcting roller 7 that corrects skew of the endless belt 8 by being brought into contact with the rear surface of the endless belt 8 that is wound between the driving roller 6 and the driven roller 5. The belt skew correcting roller 7, as shown in FIGS. 5(*a*) to 5(*d*), is a variable-diameter roller in which the roller diameter of the center portion is larger than that of both end portions. In addition, according to this embodiment, in a case where the roller diameter of the center portion is denoted by D, and the roller diameter of both the end portions is denoted by d, D−d=about 0.3 mm. Thus, the roller diameter D of the center portion is set to be larger than the roller diameter d of the end portion.

In FIGS. 5(*a*) and 5(*b*), belt skew correcting rollers 7A and 7B that are formed to have the roller diameters to be changed continuously over the entire length are shown. The belt skew correcting roller 7A shown in FIG. 5(*a*) has small diameter portions 21 and 21 in both ends and has a large diameter portion 22 in the center portion. Thus, the belt skew correcting roller 7A is formed as a variable-diameter roller of which an outer surface is a convex-curved surface from the small diameter portions 21 and 22 positioned on the left and right sides to the large diameter portion 22 positioned in the center portion. In other words, the belt skew correcting roller 7A is formed in a so-called crown shape. On the other hand, the belt skew correcting roller 7B shown in FIG. 5(*b*) has small diameter portions 21 and 21 positioned in both ends and has a large diameter portion 22 positioned in the center portion. Thus, the belt skew correcting roller 7B is formed such that the roller diameter linearly increases from the small diameter portions 21 and 21 positioned on the left and right side to the large diameter portion 22 positioned on the center.

In addition, in FIGS. 5(*c*) and 5(*d*), belt skew correcting rollers 7C and 7D that are formed to have roller diameters changed for a partial range in the axis direction are shown. Between these, the belt skew correcting roller 7C shown in FIG. 5(*c*) is a variable-diameter roller having a broad range of a large diameter portion 22 with corner portions on both ends rounded off. On the other, the belt skew correcting roller 7D shown in FIG. 5(*d*) is a variable-diameter roller having a broad range of small diameter portions 21 and 21 with only the center portion raised.

By using the belt skew correcting rollers 7 of such shapes, slip of the endless belt 8 over the belt skew correcting roller 7 can be suppressed, and a force of the belt skew correcting roller 7 for correcting the skew of the endless belt 8 is transferred to the endless belt 8 at high efficiency. In addition, by using the belt skew correcting rollers 7 of the above-described shapes, a force to incline toward the center is generated in the endless belt 8. Accordingly, occurrence of skew of the endless belt 8 is suppressed, and generation of wrinkles in the endless belt 8 is prevented.

In addition, as shown in FIG. 2, in the belt skew correction device 1, two On/Off switch-type edge sensors of a left-side edge sensor 25 and a right-side edge sensor 26 detecting the edge positions of edges disposed on the left and right sides in the belt width direction (coinciding with the axis direction B) of the endless belt 8 are disposed, in addition to the belt skew correcting roller 7. In a normal case shown in FIG. 3(*a*), both the edge sensors 25 and 26 are in the OFF state. In a case of a left-side skewed case show in FIG. 3(*b*), the left-side edge sensor 25 is set to be in the ON state, and the right-side edge sensor 26 is set to be in the OFF state. In a case of a right-side skewed case shown in FIG. 3(*c*), the right-side edge sensor 26 is set to be in the ON state, and the left-side edge sensor is set to be in the OFF state. As the edge sensors 25 and 26, non-contact type sensors such as optical sensors each including a light emitting part 27 and a light receiving part 28 are used as an example.

Moreover, as shown in FIG. 2, in the belt skew correction device 1, an inclination mechanism 29 that inclines the belt skew correcting roller 7 in a direction for correcting the skew of the endless belt 8 is disposed. The inclination mechanism 29 includes a cam operating motor 33 that is a driving body as a power source and a conversion mechanism 19 that includes relationship in which the amount of inclination of the belt skew correcting roller 7 is determined in correspondence with the amount of rotation driving of the cam driving motor 33 and converts the rotation driving of the cam operating motor 33 into inclination of the belt skew correcting roller. The conversion mechanism 19 is configured by a roller supporting frame 30, a cam follower 31 configuring a cam mechanism 39, an inclination cam 32 configuring the cam mechanism 39, and a biasing unit 34.

In addition, the cam operating motor 33 as the above-described driving body is configured to perform an intermittent drive process for each driving amount for simplifying control of rotation driving of the cam. In other words, rotation of the inclination cam 32 is intermittently performed by receiving power from the cam operating motor 33 that is a rotation driving body performing a rotation driving operation intermittently by a predetermined unit amount of driving (unit rotation angle). In addition, on a rotation shaft 40 of the inclination cam 32, a detection plate 41, for example, in which a plurality of silts is formed in a radial pattern is disposed for setting the rotation angle of the inclination cam 32. The rotation amount of the detection plate 41 can be detected by a cam position sensor 42 disposed nearby. The detection plate 41 and the cam position sensor 42 may not be disposed.

Furthermore, according to this embodiment, in order to use the belt skew correcting roller 7 also as a tension roller, an oscillating arm 35 and a tension spring 36 are included.

The roller supporting frame 30 is a support member that supports the belt skew correcting roller 7 in a state for being rotatable and performs predetermined angular rotation as denoted by arrow G shown in FIG. 4 with a fulcrum point O of rotation, which is disposed on the upper right part of FIG. 4, used as the center. In addition, in the upper left part of a free end side of rotation of the roller supporting frame 30, a shaft part 37 is disposed to be erected, and the cam follower 31 having a small circular plate shape is disposed in a state for being rotatable about the shaft part 37. In addition, in the cam follower 31, the inclination cam 32 that transfers driving to the roller supporting frame 30 is disposed in a continuous contact state. The inclination cam 32 has a cam face 38 that is formed to slowly change the cam height on a part of the peripheral face, and the inclination angle θ of the belt skew correcting roller 7 can be adjusted by changing the contact position of the cam follower 31 and the cam face 38 that is brought into contact with the peripheral face of the cam follower 31.

In other words, in the belt skew correction device according to this embodiment, the inclination mechanism 29 includes the cam operating motor 33 that is driven intermittently by a unit amount of driving and the conversion mechanism 19 that has the relationship in which the inclination amount of the belt skew correcting roller 7 is determined in correspondence with the amount of rotation driving of the cam operating motor 33 and converts driving of the cam operating motor 33 into inclination of the belt skew correcting roller 7. The conversion mechanism 19 is configured such that the relationship between the rotation driving amount of the cam operating motor 33 and the inclination amount of the belt skew correcting roller 7 has correlation having an area in which the degree of change in the corresponding inclination amount of the belt skew correcting roller 7 is low and an area in which the degree of change in the corresponding inclination amount of the belt skew correcting roller 7 is high in a case where the cam operating motor 33 intermittently proceeds with a driving operation by a unit amount of driving.

Moreover, as shown in FIG. 9, the correlation between the rotation driving amount (that is, the rotation angle of the inclination cam 32) of the cam operating motor 33 and the inclination amount of the belt skew correcting roller 7 is configured by a relative shape of the inclination cam 32 and the cam follower 31. In addition, an area located near the center of the rotation driving range of the cam operating motor 33 (that is, of the inclination cam 32) becomes an area in which the degree of the change in the inclination amount is low. On the other hand, an area located near both ends of the rotation driving range becomes an area in which the degree of the change is high. Moreover, both the areas are configured to be continuously connected to each other.

The shape of the inclination cam 32 shown in FIG. 8 is an example of the relative shape of the inclination cam 32 and the cam follower 31 for implementing the above-described correlation shown in FIG. 9. In addition, the cam follower 31 is formed in a simple cylindrical shape. Moreover, according to this embodiment, the unit amount of driving of the cam operating motor 33 set to a rotation angle of 15°, and the range of rotation driving of the cam operating motor 33 is set to 150°. The direction of inclination is set to be changed at 75° as a center position. In FIG. 8, a reference sign R denotes the rotation range (a range corresponding to 0° to 150° shown in FIG. 9) of the inclination cam 32.

The position at 75° corresponds to a designed stable position of the belt. Accordingly, in an assembly process, tension balance and a cam-fixing position are adjusted such that an area near this stable position becomes the center of the rotation range of the inclination cam 32.

In addition, the biasing unit 34 is a member that biases the roller supporting frame 30 so as to bringing the cam follower 31 into contact with the inclination cam 32 all the time. The biasing unit 34, for example, is configured by a tension coil spring. In addition, one end of the biasing unit 34 is locked with a lower right part of the roller supporting frame 30 in FIG. 4, and the other end of the biasing unit 34 is locked with an arbitrary fixed frame of the printer main body that is not shown in the figure.

In a lower left part of the roller supporting frame 30 in FIG. 4, a shaft part 43 is disposed to be erected and the oscillating arm 35 is disposed in a state for oscillating in the tightening direction and the loosening direction denoted by arrow H shown in FIG. 4 with the shaft part 43 used as a fulcrum point Q. In addition, between a base end portion 44 of the oscillating arm 35 located on the upper left part of FIG. 4 and the fulcrum point O of rotation of the roller supporting frame 30 with the fulcrum point Q of oscillation interposed therebetween, the above-described tension spring 36 that is, for example, configured by a tension coil spring is stretched.

Furthermore, the belt skew correction device 1 includes the control device 46 that performs a skew correcting control operation for the endless belt 8 by driving the cam operating motor 33 by only the unit amount (angle of 15°) of driving for a case where the ON state is detected by one (for example, 25) of the above-described edge sensors.

When a predetermined set waiting time elapses after performing rotation driving for the cam operating motor 33 (the inclination cam 32) by 15° only, the control device 46 performs determination on whether the ON state of the edge sensor (25) is released. When the ON state is not released, the control device 46 rotates the cam operating motor 33 (the inclination cam 32) further by 15° only. Thereafter, when the set waiting time elapses, the control device 46 performs determination on whether the ON state of the edge sensor (25) is released, again. Then, the same operation is configured to be repeated within limit set in advance for every set waiting time, for example, until an operation continuation time set in advance elapses.

In particular, as shown in FIG. 6, the drive amount of a driving pulse X for driving the inclination mechanism 29 and a waiting time Y (FIG. 6) until the next driving pulse X is driven are set, and the control device 46 is configured to perform the above-described skew correcting operation by transmitting the driving pulse X to the inclination mechanism 29 as an operation direction each time the waiting time Y elapses. Here, the drive amount of the driving pulse X is an amount for driving rotation of the cam operating motor 33 (inclination cam 32) by 15° only.

Description of Skew Correcting Operation

Next, a detailed skew correcting operation performed by the control device 46 will be described with reference to FIGS. 3, 7, and 9.

The skew correcting control for the endless belt 8 is performed in accordance with the drive amount (FIG. 6) of the driving pulse X and the waiting time Y (FIG. 6) until the next driving pulse X is driven which are set in advance. First, the transport driving motor 9 is driven by pushing a start switch 50 (FIG. 2), and thereby a transport operation for the endless belt 8 is started. In addition, simultaneously, the process proceeds to a state in which the left-side and right-side edges 23 and 24 of the endless belt 8 can be detected by the left-side and right-side edge sensors 25 and 26.

Then, in Step S1 of FIG. 7, the ON or OFF state of the left-side edge sensor 25 is checked. As shown in FIG. 3(*b*) when the left-side edge sensor 25 is in the ON state, the process proceeds to Step S2. Then, by rotating the cam operating motor 33 (the inclination cam 32) by the unit amount of driving of 15° only, the belt skew correcting roller 7, as shown in FIG. 3(*b*), is inclined in a direction (the direction of arrow θ) for correcting skew of the endless belt 8. The actual inclination amount of the skew correcting roller 7 at this moment is determined in accordance with the relationship shown in FIG. 9. Then, the process proceeds to Step S3. When the waiting time Y elapses, it is determined whether the ON state of the edge sensor 25 is released. When the ON state is not released, the cam operating motor 33 (the inclination cam 32) is rotated further by 15° only. Thereafter, when the set waiting time Y elapses, it is determined again whether the ON state of the edge sensor 25 is released. The same operation is repeated every set waiting time until the operation continuation time (for example, a time needed for ten cycles of the endless belt 8) set in advance elapses.

On the other hand, when the left-side edge sensor 25 is in the OFF state, the process proceeds to Step S4. Then, the ON or OFF state of the right-side edge sensor 26 is checked. As shown in FIG. 3(*c*), when the right-side edge sensor 26 is in the ON state, the process proceeds to Steps S5 and S6. Then, "rotation by the unit amount of driving of 15° only" and "determination after elapse of the waiting time Y" that are the same as Steps S2 and S3 are performed. Then, the same operation is repeated for every set waiting time until the operation continuation time set in advance elapses.

When the inclination is not resolved after the operation continuation time set in advance elapses, a warning is published, the cam operating motor 33 is stopped by the transport driving motor 9, and all the operations are in a stopped state. When all the operations are stopped by publishing a warning, the tension of the belt skew correcting roller 7 that is applied to the rear surface of the endless belt 8 is released, and thereby the inclination of the endless belt 8 is resolved manually. Then, a reset operation is performed so as to return to the basic control operation.

In other words, according to this embodiment, when the cam operating motor 33 (the inclination cam 32) proceeds with intermittent rotation in units of 15°, the relationship between the drive amount of the cam operating motor 33 (the inclination cam 32) and the inclination amount of the skew correcting roller 7 is configured to have correlation having an area in which the degree of a corresponding change in the inclination amount is low and an area in which the degree of a corresponding change in the inclination amount is high. Accordingly, by only driving the cam operating motor 33 (the inclination cam 32) in units of 15° intermittently, both speedy control (near both ends in FIG. 9) and delicate control (near the center in FIG. 9) for belt skew correction can be performed during a series of skew correction operations. In other words, when the belt 8 is in a state (highly unstable state) of high skew speed or in a state (slightly unstable state) of low skew speed which is slightly deviated from a stable state, skew correction that is appropriate to each state can be performed.

Moreover, according to this embodiment, when the endless belt 8 returns from the highly unstable state to the stable state, as can be known from FIG. 9, first speedy skew correction is performed, and as the skew speed decreases, the correction is gradually changed to slow skew correction. Then, finally, the most delicate skew correction is performed. Accordingly, the endless belt 8 can be returned to the position of the stable state in an easy manner.

In addition, when the endless belt 8 is in the slightly unstable state from the stable state for any reason, the cam operating motor 33 (the inclination cam 32) is rotated intermittently in units of 15°. However, at this moment, the skew correcting roller 7 changes its slope delicately from the initial position (for example, the position of 75° in FIG. 9). Accordingly, the skew correcting roller 7 can take a state of a slope (small slope) that is appropriate to skew correction for the slightly unstable state. In other words, an appropriate slope that is not excessive can be set for performing skew correction. Accordingly, the endless belt 8 can be returned from the slightly unstable state to the stable state in a smooth manner.

On the other hand, when the endless belt 8 becomes the highly unstable state abruptly from the stable state for any reason, the cam operating motor 33 (the inclination cam 32) proceeds with intermittent driving in units of 15°, and thereby the slope of the skew correcting roller 7 is increased gradually. At that moment, first, the change of the slope of the skew correction roller 7 is delicate (near the center in FIG. 9). However, when the region is passed though, the change of the slope for each unit amount of driving (15°) increases (near both end of FIG. 9). Accordingly, in order to perform skew correction for the slightly unstable state appropriately, an area in which the slope of the skew correcting roller 7 is changed delicately is included, and an area (near both ends in FIG. 9) in which the change of the slope of the skew correcting roller 7 for each unit amount (15°) of driving of the cam operating motor 33 (the inclination cam 32) is large is included. Accordingly, a total transition time needed for the skew correcting roller 7 to take the large slope state that is appropriate for the highly unstable state can be shortened.

EMBODIMENT 2

Embodiment 2 is an embodiment in which a table that correlates a value that is changed by the cam operating motor 33 (the inclination cam 32) for each unit amount (unit rotation angle) of driving and a waiting time Y (the set waiting time) corresponding to the value is generated in advance, the table is stored in the control unit 46, and cam operating motor 33 (the inclination cam 32) is configured to change the waiting time Y in accordance with the value changed for each unit amount (the unit rotation angle) of driving based on the table.

In FIG. 10, an example of the table that relates the value that is changed by the cam operating motor 33 (the inclination cam 32) for each unit amount (rotation driving by 5° each time) of driving and a waiting time Y corresponding to the value is shown.

Figure 12:
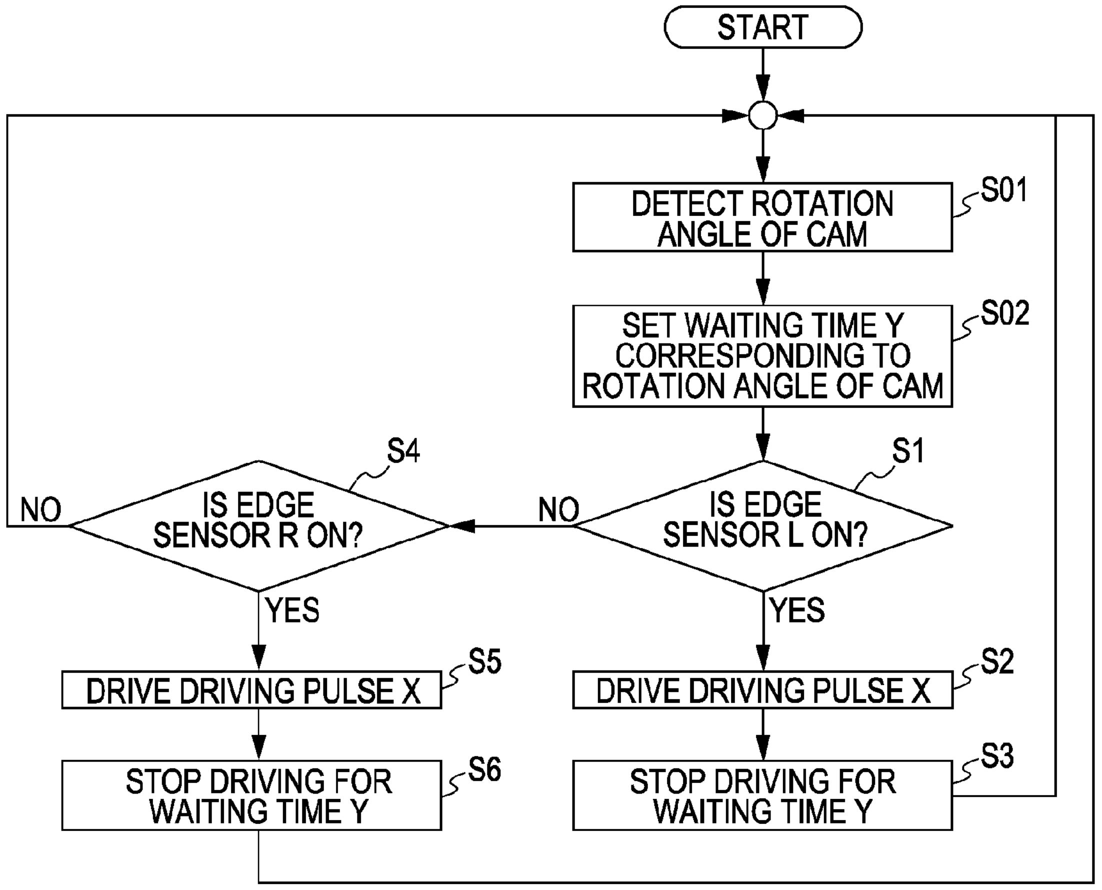
FIG. 12 is a flowchart showing an example of skew correcting control for an endless belt according to Embodiment 2.

When the waiting time Y is set in correspondence with the value that is changed by the cam operating motor 33 (the inclination cam 32) for each unit amount (unit rotation angle) of driving, as shown in FIG. 12, first, the rotation angle of the inclination cam 32 is detected (Step S01), and the waiting time corresponding to the rotation angle is set based on the table that is stored inside the above-described control device (Step S02), and then, the process proceeds to Step S1. The control operations of Step S1 and steps thereafter that are performed after Step S02 are the same as those described in FIG. 7 that are described in "Description of Skew Correcting Operation", and thus a description thereof is omitted.

The contents of Embodiment 2 will be described with reference to FIGS. 3, 6, 10, 11, and 12, divided into control for preventing skew of the belt in the slightly unstable state and control for preventing skew of the belt in the highly unstable state.

First, control for returning the skewed belt in the slightly unstable state to the stable state will be described.

Figure 11:
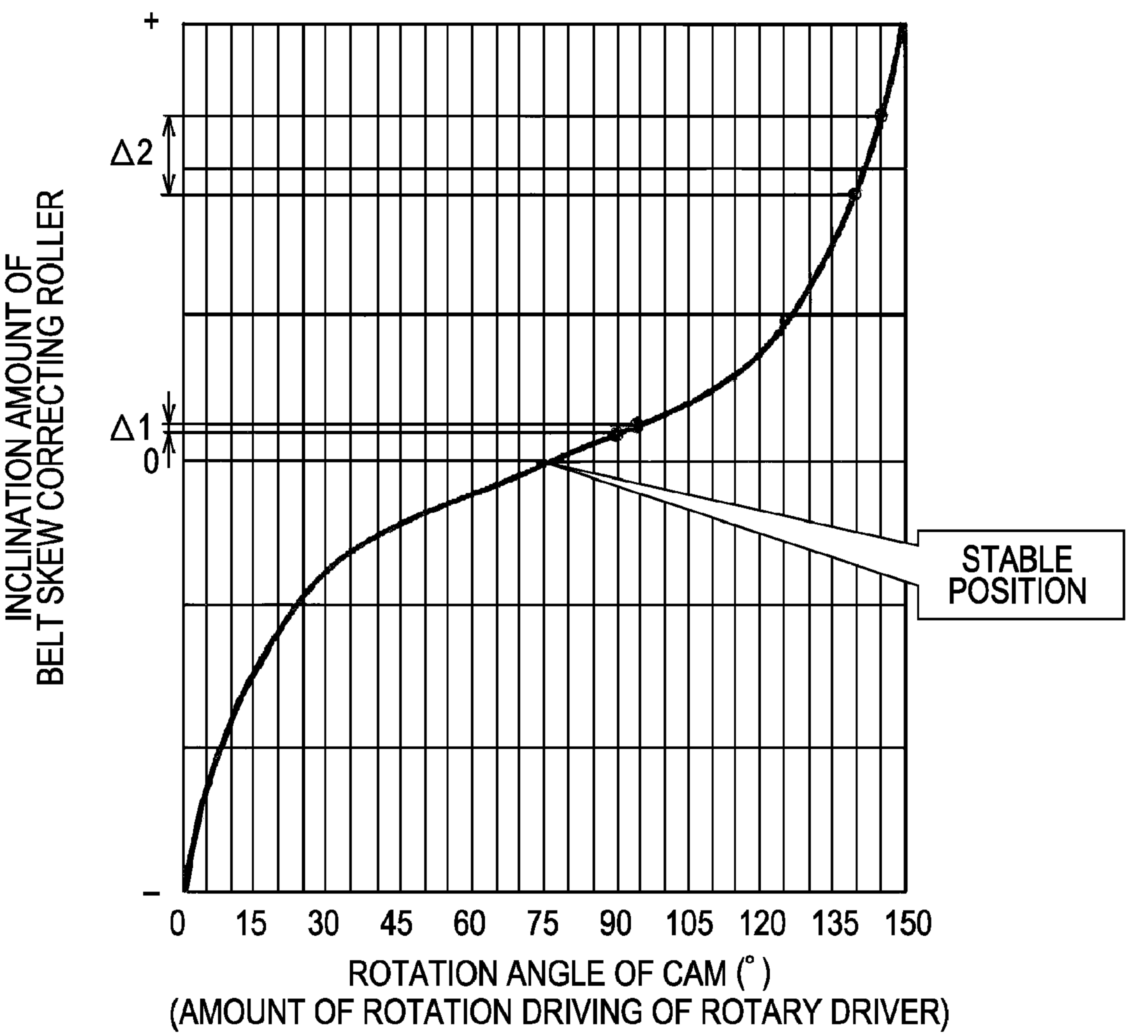
FIG. 11 is a diagram showing relationship between the rotation angle (the rotation angle of a rotation driving body) of an inclination cam and the inclination amount of a belt skew correcting roller according to Embodiment 2.

A case where the rotation driving amount (hereinafter referred to as a "rotation angle of the cam") of the rotation driving body is changed from 90° to 95° in FIG. 11 will be described as an example.

When the rotation angle of the cam is changed from 90° to 95° in FIG. 11, the change of the inclination amount (hereinafter, referred to as only "inclination amount") of the belt skew roller 7 is merely (Δ1). In other words, the inclination amount of the belt skew correcting roller 7 in FIG. 3(*b*) (or (*c*)) is merely (Δ1). Accordingly, since the inclination amount is small, a force for correcting the skew of the belt is small. Therefore, in the slightly unstable state, a force for skewing the belt is stronger than the force for correcting the skew of the belt. Then, a difference between the forces tends to increase in the slightly unstable state in which the inclination amount is small.

Thus, by setting the waiting time Y in FIG. 6 to be small, that is, having the skewed state of the belt detected delicately by the edge sensor 25 or the edge sensor 26, the driving pulse X is driven in the ON state so as to increase the inclination amount. Thereby, the force for correcting the skew of the belt is increased. Under such control, a difference between the force for correcting the skew of the belt and the force for skewing the belt is decreased. Accordingly, the state of the skew of the belt can be checked delicately, and thereby skew of the belt can be prevented.

The control method for preventing the skew of the belt will be described in detail with reference to FIGS. 10, 11, and 12.

It is assumed that at a time point of start of the control, the rotation angle of the cam is 90° and the edge sensor 25 is in the ON state for description below.

First, in FIG. 12, first, 90° as the rotation angle of the cam is detected in Step S01. Next, in Step S02, a waiting time Y corresponding to the rotation angle of the cam of 90°, that is, 2.5 seconds is set based on the table shown in FIG. 10. Next, in Step S1, the ON-OFF state of the edge sensor 25 is determined. Since the edge sensor 25 in the ON state at the current time point (FIG. 3(*b*)), in Step S2, the driving pulse X is driven so as to change the rotation angle of the cam by the unit amount (5°) of driving. In other words, the rotation angle of the cam is changed from 90° to 95°. Then, driving of the cam operating motor 33 is stopped only for 2.5 seconds that is the above-described waiting time Y.

In addition, when the edge sensor 25 is in the ON state at a time point when 2.5 seconds elapses, the process proceeds back to Step S01, and 95° that is the rotation angle of the cam is detected. Subsequently, in Step S02, a waiting time Y in the table shown in FIG. 10 corresponding to the rotation angle of the cam of 95°, that is, 3 seconds is set. Next, in Step S1, the ON or OFF state of the edge sensor 25 is determined. When the state of the edge sensor 25 is the OFF state, the process proceeds to Step S4. Here, the ON-OFF state of the edge sensor 26 is determined. When the state of the edge sensor 26 is the OFF state (when skew of the belt is corrected), the process proceeds back to Step S01 again.

Then, the process proceeds back to Step S01, and 95° as the rotation angle of the cam is detected. Subsequently, in Step S02, a waiting time Y corresponding to the rotation angle of the cam of 95° in the table shown in FIG. 10, that is, 3 seconds is set. Next, the ON-OFF state of the edge sensor 25 is determined in Step S1. When the state of the edge sensor 25 is the OFF state, the process proceeds to Step S4. Here, the ON-OFF state of the edge sensor 26 is determined. When the state of the edge sensor 26 is the ON state (FIG. 3(*c*)), in Step S5, the driving pulse X is driven so as to change the rotation angle of the cam by a unit amount (5°) of driving. In this case, the cam operating motor 33 rotates reversely so as to change the rotation angle of the cam from 95° to 90°. Next, in Step 6, the driving of the cam operating motor is stopped for only 3 seconds that is the waiting time Y at a time when the above-described rotation angle of the cam is 95°. Here, when the edge sensor 26 is in the ON state at a time point when 3 seconds elapses, the process proceeds back to Step S01 so as to detect 90° as the rotation angle of the cam. Thereafter, the control of the above-described Steps S01 to S6 is performed repeatedly. Under such control, the skew of the belt is prevented.

Next, control for returning the skewed belt in the highly unstable state to the stable state will be described.

A case where the rotation driving amount (hereinafter referred to as a "rotation angle of the cam") of the rotation driving body is changed from 140° to 145° in FIG. 11 will be described as an example.

When the rotation angle of the cam is changed from 140° to 145° in FIG. 11, the change of the inclination amount (hereinafter, referred to as only "inclination amount") of the belt skew correcting roller 7 is quite large (Δ2) compared to the change in the slightly unstable state for a same change of the rotation angle of 5°. In other words, the inclination amount of the belt skew correcting roller 7 in FIG. 3(*b*) (or (*c*)) is quite large (Δ2). Accordingly, since the inclination amount is large, a force for correcting the skew of the belt is large. Therefore, in the highly unstable state, a force for correcting the skew of the belt is large, compared to a case of the slightly unstable state. In other words, the difference between the forces decreases in the slightly unstable state in which the inclination amount is large. Actually, when the inclination amount is changed in the highly unstable state, the change amount is large, and accordingly, a state in which the force for correcting the skew of the belt tends to be slightly stronger than the force for skewing the belt.

Here, since the force for correcting the skew of the belt is slightly larger than the force for skewing the belt, the skewed belt tends not to move in a direction for correction immediately. Thus, even when the belt is moved, the movement is slow in the direction for correction. In other words, in FIG. 3(*b*) (or (*c*)), the ON state of the edge sensor 25 (or the edge sensor 26) is continued for a while.

In such a state, when the waiting time Y in FIG. 6 is set to be small, the ON state of the edge sensor 25 (or the edge sensor 26) continues for a while. Accordingly, when a short waiting time is set, the edge sensor 25 (or the edge sensor 26) detects the ON state several times. Then, the inclination cam 32 is driven (driving pulse X) by the unit amount of driving so as to supply the force for correcting the belt to the belt. In the highly unstable state, even when the rotation angle of the cam is changed by the unit amount (5°) of driving that is the same as in the slightly unstable state, the inclination amount is large ($\Delta 1 < \Delta 2$). Accordingly, a force that is larger than that in the slightly unstable state is applied to the belt for correcting the skew of the belt.

For example, even in a case where transition from the ON state to the OFF state is made if waited slight longer (right before the edge sensor 25 or the edge sensor 26 becomes the OFF state), the waiting time Y in FIG. 6 is set to be short. Accordingly, a state in which the waiting time Y elapses and the ON state is detected by the edge sensor 25 or the edge sensor 26 may be formed.

Then, when the ON state is detected, the driving pulse X is driven so as to change the rotation angle of the cam, and accordingly, the force for correcting the skew of the belt is added. Thus, in a case where the transition from the ON state to the OFF state is made if a small remaining force is added, when the remaining force is added, a force for correcting the skew of the belt that is larger than that in the slightly unstable state is operated. Accordingly, a situation in which the belt is skewed again by passing the normal state, that is, control for preventing the skew of the belt becomes excessive occurs.

Therefore, in the highly unstable state, the waiting time is set to be long, so that excessive control is suppressed.

In addition, a detailed control method for preventing the skew of the belt for a case where the rotation angle of the cam is changed from 140° to 145° is as is shown in FIG. 12 and is the same as the control method for preventing the skew of the belt for a case where the rotation angle of the cam is changed from 90° to 95°. Thus, a description thereof is omitted.

OTHER EMBODIMENTS

A belt skew correction device 1 according to the present invention, a belt transportation device 20 having the belt skew correction device 1, and a recording device 100 having the belt transportation device 20 basically have the above-described configurations. However, the configurations can be changed or omitted partly without departing from the gist of the invention.

For example, the shape of the inclination cam 32 is not limited to the shape shown in FIG. 8. Thus, it is possible that the shape of the inclination cam 32 can be arbitrary configured by using a relative shape with respect to the cam follower 31. In addition, the shape of the skew correcting roller is not limited to the above-described variable-diameter roller and may be a constant-diameter roller.

In addition, the belt skew correction device 1 according to the present invention may be applied to a belt transportation device 20 that is built in other recording devices other than the ink jet printer 100, a belt transportation device 20 that is built in other electronic devices other than the recording device, or a belt transportation device 20 that is independently used for transportation of products.

The invention claimed is:

1. A belt skew correction device comprising:

a belt skew correcting roller that corrects skew of an endless belt by being brought into contact with the endless belt that is wound between a driving roller and a driven roller;

a driving body that performs a driving operation which causes the skew correcting roller to incline in a direction for correcting the skew of the endless belt, wherein a rate change of the incline in the direction for correcting the skew of the endless belt is non-linear and varies in association with a rate at which the driving body is driven, such that the rate of change of the inline when there is a small skew and the driving body is driven at a smaller rate is less than the rate of change of the incline when there is a large skew and the driving body is driven at a larger rate; and a sensor which detects the skew of the endless belt;

a control device that drives the driving body based on the detection of the sensor, wherein a driving state of the driving body is maintained for a predetermined period of time after the sensor detects a skew in the endless belt, and wherein the control device drives the driving body for an additional period of time if the skew is not reduced when the predetermined period of time elapses.

2. The belt skew correction device according to claim 1, wherein an area near the center of a driving range of the driving body is an area in which the rate of the incline in the direction for correcting the skew is low, an area near both ends of the driving range is an area in which rate of the incline in the direction for correcting the skew is high, and both the areas are continuously connected to each other.

3. The belt skew correction device according to claim 2, wherein the driving body is a rotation driving body, and further comprising:

a cam mechanism which rotates integrally with the rotation driving body; and a cam follower disposed on the belt skew correcting roller side, and wherein the rate of incline in the driving body is configured by a relative shape between the cam and the cam follower.

4. The belt skew correction device according to claim 1, wherein the belt skew correcting roller is a variable-diameter roller of which a roller diameter in the center portion is larger than that in both the end portions.

5. The belt skew correction device according to claim 1, wherein the sensor comprises edge sensors of an ON-OFF switch type that detect each edge position in the belt width direction of the endless belt, the belt skew correction device further comprising:

a control device that performs skew correction control for the endless belt by driving the driving body by the unit amount of driving at a time when the edge sensors on one side detect the ON state, wherein the control device, when a predetermined waiting time elapses after driving the driving body by the unit amount of driving, determines whether the ON state of the edge sensor is released, further drives the driving body by the unit amount of driving for a case where the ON state is not released, determines again whether the ON state of the edge sensor is released when the waiting time elapses thereafter, and repeats a same operation within limit set in advance for every the waiting time.

6. The belt skew correction device according to claim 5, wherein the waiting time is set in correspondence with a value of the driving amount acquired at a time when the driving body is driven by the unit amount of driving.

7. A belt transportation device comprising a belt skew correction device that includes:

a driving roller that applies a transport force to an endless belt;

a driven roller that is disposed to face the driving roller and maintains the endless belt in a strained state together with the driving roller;

the endless belt that is wound between the driving roller and the driven roller; and a belt skew correcting roller that corrects skew of the endless belt by being brought into contact with a surface of the endless belt, wherein the belt skew correction device is the belt skew correction device according to claim 1.

8. A recording device comprising:

a belt transportation device that holds and transports a recording material; and a recording unit that performs recording for the recording material that is held and transported by the belt transportation device, wherein the belt transportation device is the belt transportation device according to claim 7.

9. The belt skew correction device according to claim 1, wherein the detection by the sensor is repeated at predetermined intervals within a predetermined limit of time.

10. The belt skew correction device according to claim 9, wherein the length of the predetermined intervals varies in association with the rate at which the driving body is driven.

* * * * *